US 6,568,617 B1

(12) United States Patent
Rambosek

(10) Patent No.: US 6,568,617 B1
(45) Date of Patent: May 27, 2003

(54) LEADER WITH SMOOTHING INDENTURE

(75) Inventor: G. Phillip Rambosek, Shafer, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 10/112,365

(22) Filed: Mar. 28, 2002

(51) Int. Cl.⁷ .............................................. G11B 15/66
(52) U.S. Cl. .................. 242/332.4; 242/532.1; 360/132
(58) Field of Search ............... 242/332.4, 332.1, 242/332.2, 332, 348, 348.2, 348.3, 532, 532.1, 532.6, 532.7, 582, 338; 360/132

(56) References Cited

U.S. PATENT DOCUMENTS

| 4,572,460 A | | 2/1986 | Hertrich | |
| 5,229,804 A | * | 7/1993 | Pagano | 242/348.3 |
| 5,769,346 A | | 6/1998 | Daly | |
| 6,079,651 A | * | 6/2000 | Hamming | 242/332.4 |
| 6,135,379 A | | 10/2000 | Argumedo | |
| 6,227,475 B1 | | 5/2001 | McAllister et al. | |
| 6,332,584 B1 | * | 12/2001 | Bakeman, Jr. | 242/348 |
| 6,338,448 B1 | * | 1/2002 | Magnusson | 360/132 |
| 6,360,979 B1 | * | 3/2002 | Larson | 242/332.4 |
| 6,398,143 B1 | * | 6/2002 | Kim et al. | 242/332.4 |
| 6,439,489 B1 | * | 8/2002 | Hoge | 242/332.4 |

* cited by examiner

Primary Examiner—William A. Rivera
(74) Attorney, Agent, or Firm—Eric D. Levinson

(57) ABSTRACT

A leader for use with a tape reel including a first end, a second end spaced from the first end, and an elongated section extending between the first end and the second end. The second end has a connection feature configured to be selectively coupled with a second leader. The elongated section defines a smoothing indenture that does not extend through the thickness of the leader. The smoothing indenture is positioned to receive the connection feature as the leader tape is wound about a tape reel and is configured to limit embossment of a storage tape otherwise associated with the leader in the wound state.

20 Claims, 5 Drawing Sheets

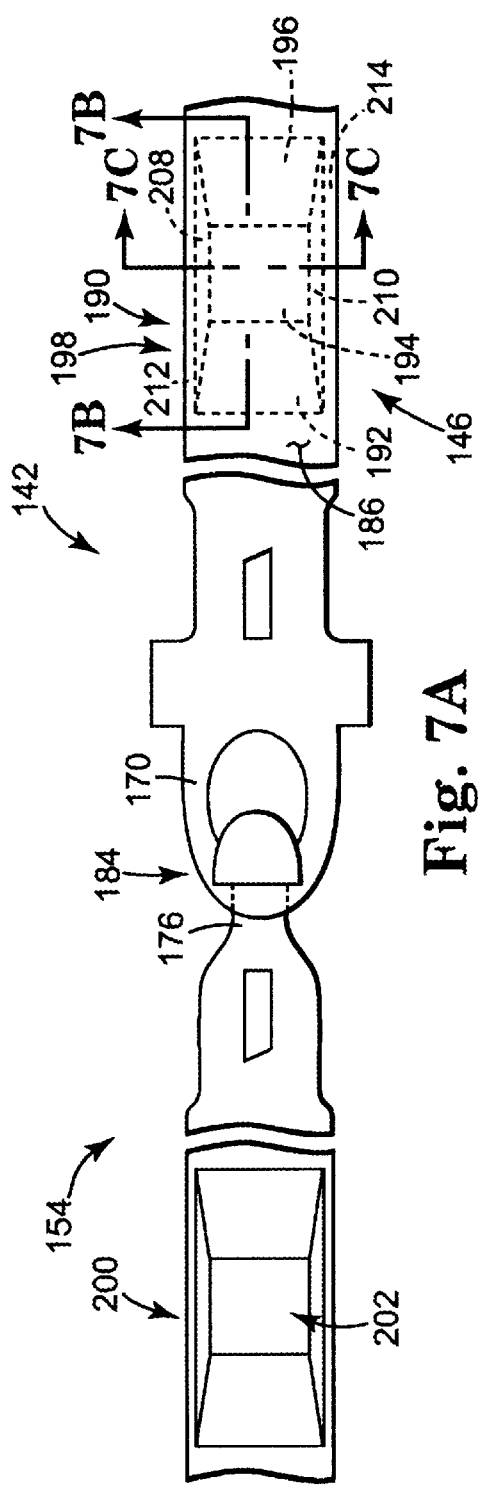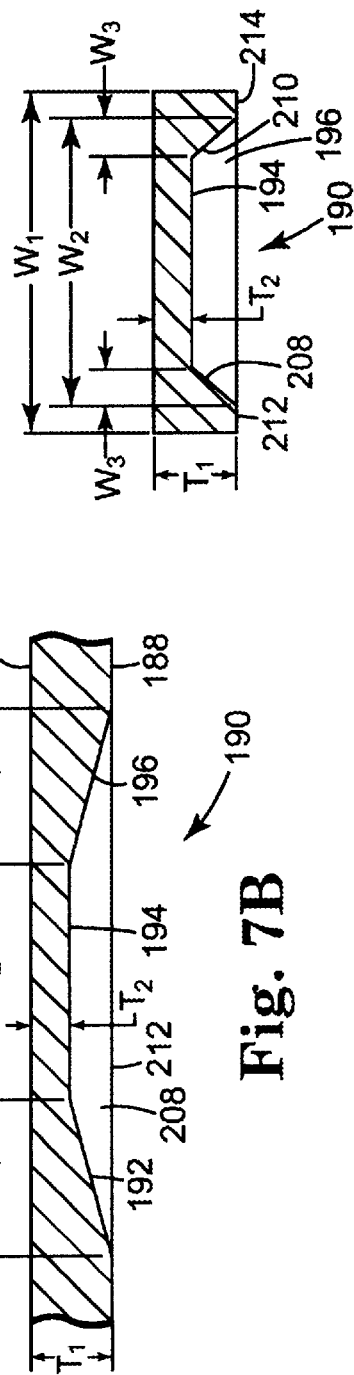

LEADER WITH SMOOTHING INDENTURE

BACKGROUND OF THE INVENTION

The present invention relates to the field of magnetic tape data storage and a leader useful therewith. More particularly, it relates to a leader including a smoothing. indenture to prevent embossment of a storage tape upon winding within a tape drive assembly.

Data storage tape cartridges and tape drives have been used for decades in the computer, audio, and visual fields to store data, programs and other information. The data storage tape cartridge is an extremely popular form of recording large volumes of information for subsequent retrieval and use. A common data storage tape cartridge is a single reel tape cartridge.

One type of the single reel tape cartridge typically includes a cartridge housing, a supply reel or spool, a magnetic storage tape, and a cartridge tape leader. The supply reel is secured within the cartridge housing in a manner allowing the supply reel to rotate within the cartridge housing. A trailing end of the magnetic storage tape is secured to the supply reel and a leading end of the magnetic storage tape is secured to the cartridge tape leader. In general, a leader is an elongated piece of relatively thin material adapted to assist in guiding the magnetic storage tape out of the cartridge housing and through a tape drive assembly, further described below. In particular, the cartridge tape leader is a leader specifically adapted to be selectively secured to a take-up reel leader (further described below) as otherwise provided with the tape drive assembly. Regardless, the magnetic storage tape and the cartridge tape leader are wound about the supply reel. The cartridge housing further includes an opening or window positioned to allow the tape drive assembly to access to the cartridge tape leader and magnetic storage tape within the cartridge housing.

The tape drive assembly useful with the above-described cartridge includes a drive housing, a take-up reel, the take-up reel leader, a cartridge receiving area, a buckling mechanism, and a read/write head. The take-up reel is mounted within the drive housing in a manner allowing rotation of the take-up reel. A fixed end of the take-up reel leader is secured to the take-up reel. The take-up reel leader extends from the fixed end to a free end adapted for engaging the cartridge tape leader. The cartridge receiving area allows the single reel cartridge to be inserted and selectively maintained by the tape drive assembly. The buckling mechanism is located within the drive housing in a position to allow access to the take-up reel leader and the cartridge tape leader following insertion of the cartridge.

The buckling mechanism automatically accesses and interposes, or buckles, the take-up reel leader and the cartridge tape leader to selectively secure the leaders. Once the cartridge tape leader is secured to the take-up reel leader, the take-up reel rotates within the drive housing, directing the cartridge tape leader and the magnetic storage tape from the supply reel, through a defined tape path in the tape drive, and winding about the take-up reel. The read/write head is mounted within the drive housing along the defined tape path for interacting with the magnetic storage tape.

Although this system is a viable method of transferring tape from the supply reel to the take-up reel, the buckled connection of the take-up reel leader to the cartridge tape leader creates an area of double tape thickness. Upon winding on the take-up reel, the area of double thickness creates a bump in the magnetic storage tape that is subsequently wound about the take-up reel (i.e., over the buckled connection). The bump(s) create impressions in the magnetic storage tape that often cause a gap and may lead to a reading or writing error when the gap moves past the head.

A typical response to the above problem is illustrated in FIG. 1, that otherwise depicts a cartridge tape leader 10 buckled to a take-up reel leader 12 via a buckled connection 14. The cartridge tape leader 10 and the take-up reel leader 12 are each provided with an aperture 16 and 18, respectively, each located a predetermined distance from the buckled connection 14. In particular, and as illustrated in FIG. 2, upon winding of the take-up reel leader 12 around a take-up reel 20, the aperture 16 of the cartridge tape leader 10 is located to be wound directly upon the buckled connection 14, thereby reducing the extra bulk caused by the buckled connection 14 and reducing the resulting bumps upon subsequent windings of the magnetic storage tape 22. Similarly, the aperture 18 is positioned such that the buckled connection 14 fits within the aperture 18, further reducing the bulk of the buckled connection 14 relative to subsequently wound layers and, consequently, the creation of bumps. Thus, locations of the apertures 16, 18 relative to the buckled connection 14 are based upon a known diameter of the take-up reel 20 (i.e., a distance equal to approximately one revolution of the take-up reel 20).

Although the addition of the apertures 16 and 18 to the cartridge tape leader 10 and the take-up reel leader 12 has successfully prevented bumps from building up about the buckled connection 14, other concerns have been identified. In particular, each of the apertures 16 and 18 are defined by sharp edges 24 (referenced generally in FIG. 2). The sharp edges 24 of the apertures 16 and 18 are unsupported. The sharp edges 24, especially the sharp edges 24 formed by the aperture 16 of the cartridge tape leader 10, can be imprinted and transmitted through many layers of the magnetic storage tape 22 as it is wound over the aperture 16. This causes areas of embossment 26 in the magnetic storage tape 22, which can cause read errors when the magnetic tape 22 moves past the head (not shown). Therefore, use of the apertures 16 and 18, and in particular, the aperture 16 of the cartridge tape leader 10, may cause loss of information or non-use of a portion(s) of the magnetic tape 22. Notably, recent advancements in magnetic tape technology have resulted in thinner gauge media. The above mentioned potential for aperture-induced embossment is even greater with these thinner gauge products.

Although the current take-up reel leaders and cartridge tape leaders are viable for current data storage tape cartridge applications and reading within the drive, the potential for forming areas of embossment and losing information are frustrating complications. As such, a need exists for a leader configured to decrease the bulk of the buckled connection without causing tape embossment.

SUMMARY OF THE INVENTION

One aspect of the present invention relates to a leader for use with a tape reel. The leader includes a first end, a second end, and an elongated section. The second end of the leader is spaced from the first end and has a connection feature adapted to be selectively coupled to a second leader. The elongated section extends between the first end and the second end, and defines a smoothing indenture not otherwise extending through a thickness of the leader. The smoothing indenture is positioned to receive the connection feature as the leader is wound about the tape reel. The first smoothing indenture is configured to limit embossment of a storage tape otherwise associated with the leader upon winding of the storage tape about the take-up reel.

Another aspect of the present invention relates to a data storage tape cartridge including a housing, a supply reel, a storage tape, and a cartridge tape leader. The supply reel is rotatably disposed within the housing. The storage tape has a first end and a second end. The first end of the storage tape is maintained by the supply reel. The cartridge tape leader includes a first end, a second end, and an elongated section. The first end of the cartridge tape leader is secured to the second end of the storage tape. The second end of the cartridge tape leader defines a connection feature configured to be selectively coupled with a take-up reel leader. The elongated section extends between the first end and the second end of the cartridge tape leader. The elongated section defines a smoothing indenture not otherwise extending through a thickness of the cartridge tape leader. The smoothing indenture is positioned to receive the connection feature as the storage tape is wound about the take-up reel. The smoothing indenture is configured to limit embossment of the storage tape upon winding about the take-up reel.

Yet another aspect of the present invention relates to a tape winding system for winding tape about a tape reel. The tape winding system includes a tape drive assembly and a data storage tape cartridge. The tape drive assembly includes a takeup reel and a take-up reel leader. The take-up reel leader includes a first end secured to the take-up reel, a second end spaced from the first end, and an elongated section extending between the first end and the second end. The second end defines a first connection feature. The data storage tape cartridge includes a housing, a supply reel rotatably disposed within the housing, a storage tape, and a cartridge tape leader. The storage tape has a first end maintained by the supply reel and a second end. The cartridge tape leader includes a first end secured to the second end of the storage tape, a second end spaced from the first end, and an elongated section extending therebetween. The second end defines a second connection feature adapted to be selectively coupled to the first connection feature. The elongated section of the cartridge tape leader defines a first smoothing indenture not otherwise extending through a thickness of the cartridge tape leader. The first smoothing indenture is positioned to receive the first and second connection features as the cartridge tape leader and take-up reel leader are wound about the take-up reel. The first smoothing indenture is configured to limit embossment of the storage tape when it is wound about the take-up reel

BRIEF DESCRIPTION OF THE DRAWINGS

FIG. 7A is a schematic view of a portion of an alternative embodiment cartridge tape leader and take-up reel leader in accordance with the present invention;

FIG. 7B is a cross-sectional view of the cartridge tape leader of FIG. 7A along the line 7B—7B; and FIG. 7C is a cross-sectional view of the cartridge tape leader of FIG. 7A along the line 7C—7C.

DESCRIPTION OF THE PREFERRED EMBODIMENTS

Figure 3:
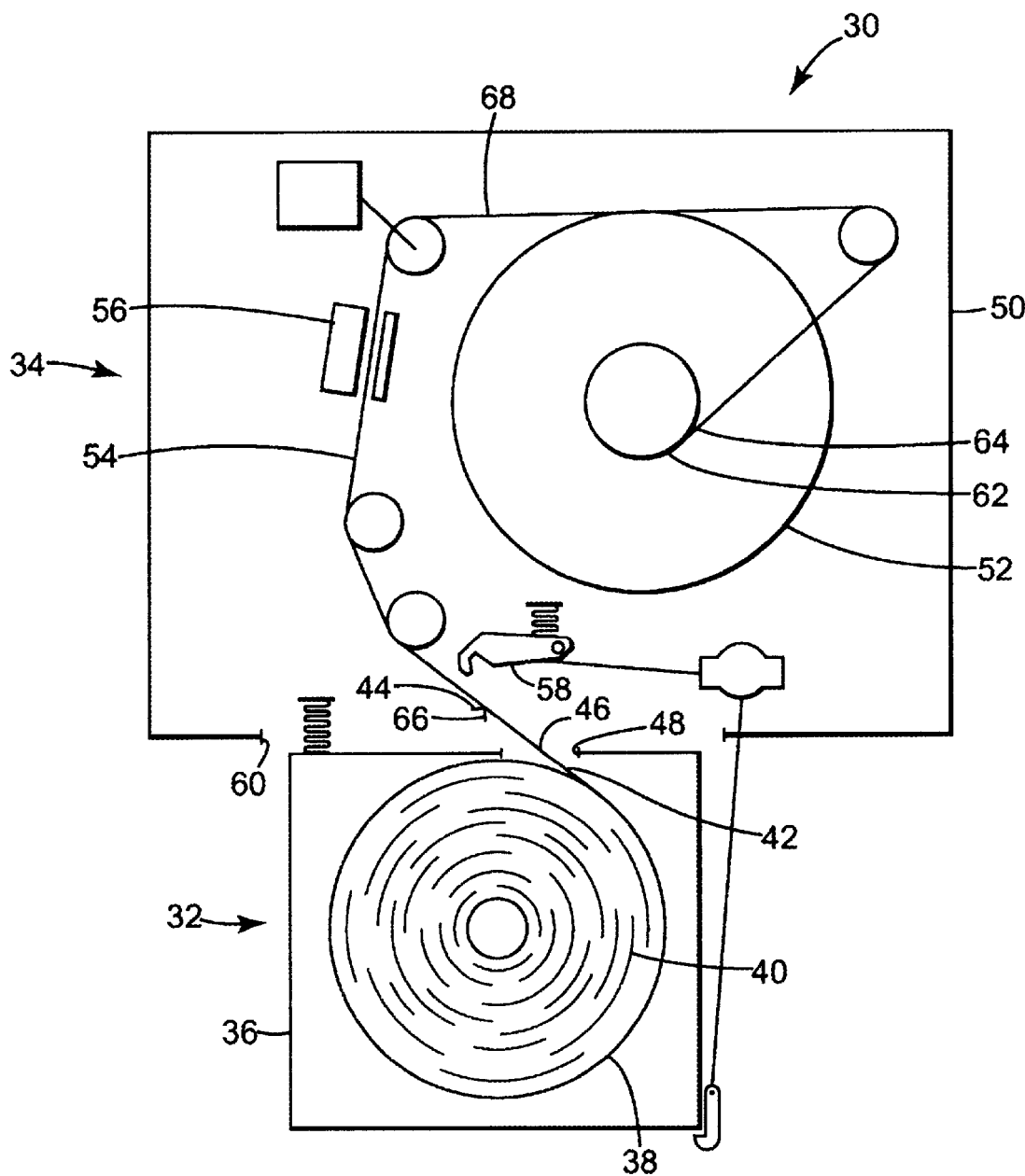
FIG. 3 is a top plan schematic view of a portion of a tape winding system in accordance with the present invention.

The present invention relates to a leader useful with a single reel data storage tape cartridge as part of a tape drive winding system. To this end, an exemplary tape winding system 30 is illustrated in FIG. 3. Generally speaking, the tape winding system 30 includes a data storage tape cartridge 32 and a tape drive assembly 34. The data storage tape cartridge 32 is sized to be received by the tape drive assembly 34.

The data storage tape cartridge 32 typically includes a cartridge housing 36, a supply reel 38, a magnetic storage tape 40, and a cartridge tape leader 42. The supply reel 38 is rotatably mounted within the cartridge housing 36. A first end (not shown) of the magnetic storage tape 40 is secured to the supply reel 38 and a second end (not shown) of the magnetic storage tape 40 is secured to a first end (not shown) of the cartridge tape leader 42. The cartridge leader 42 further defines a second end 44 and an elongated section 46 extending between the first end and the second end 44. The magnetic storage tape 40 and the cartridge tape leader 42 are wound upon the supply reel 38, leaving the second end 44 of the cartridge tape leader 42 loose about the winding. An access window 48 is defined by the cartridge housing 36 and serves as an opening for the cartridge tape leader 42 and magnetic storage tape 40 to exit from the cartridge housing 36 such that the cartridge tape leader 42 and the magnetic storage tape 40 can be threaded into the tape drive assembly 34.

The magnetic tape 40 is preferably of a type commonly known in the art. For example, the magnetic tape 40 may consist of a balanced polyethylene naphthalate (PEN) based material coated on one side with a layer of magnetic material dispersed within a suitable binder system and on the other side with a conductive material dispersed within a suitable binder system. Acceptable magnetic tape is available, for example, from Imation Corp. of Oakdale, Minn.

The tape drive assembly 34 generally includes a drive housing 50, a take-up reel 52, a take-up reel leader 54, a head 56, and a buckling mechanism 58. The drive housing 50 defines a cartridge receiving area 60 sized to selectively receive and maintain the data storage tape cartridge 32. The take-up reel 52 is located within the drive housing 50, spaced from the cartridge receiving area 60. The take-up reel 52 includes a rotatable hub 62 located in the center of the take-up reel 52.

The take-up reel leader 54 includes a first end 64, a second end 66, and an intermediate elongated section 68. The first end 64 is secured to the hub 62 of the take-up reel 52. The second end 66 is spaced from the first end 64, and the elongated section 68 extends between the first end 64 and the second end 66. The second end 66 is routed through the tape drive assembly 34, past the head 56 and towards the cartridge receiving area 60 along a defined tape path. The head 56 is mounted within the drive housing 50, spaced from the take-up reel 52 and the cartridge receiving area 60. The head 56 is positioned along the defined tape path so as to interface with the magnetic storage tape 40 during use. The head 56 is preferably adapted to read and/or write the information from or to the magnetic storage tape 40 as it passes by.

The buckling mechanism 58 is secured to the drive housing 50 near the cartridge receiving area 60. Upon insertion of the data storage tape cartridge 32, the buckling mechanism 58 is adapted to access the second end 44 of the cartridge tape leader 42 and the second end 66 of the take-up reel leader 54. The buckling mechanism 58 is configured to connect the take-up reel leader 54 and the cartridge tape leader 42.

Figure 4A:
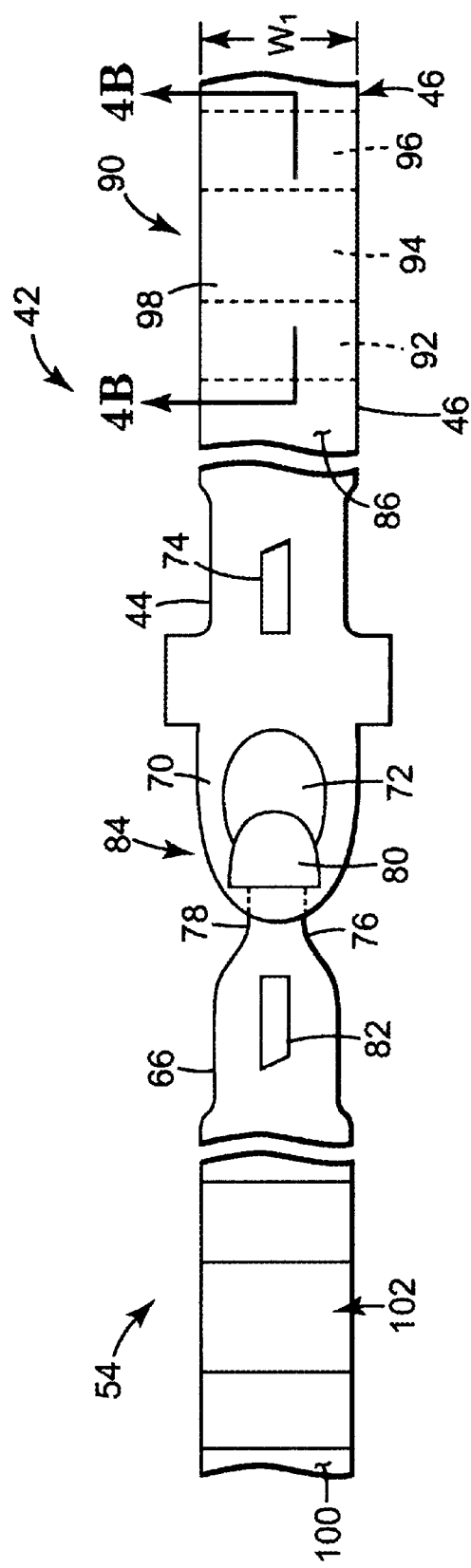
FIG. 4A is a schematic view of a cartridge tape leader and a take-up reel leader of the tape winding system of FIG. 3.

A portion of the cartridge tape leader 42 and a portion of the take-up reel leader 54 in accordance with a preferred embodiment of the present invention are shown in greater detail in FIG. 4A. The second end 44 of the cartridge tape leader 42 includes a connection feature 70 as is known in the art. Preferably, the connection feature 70 is a locking aperture 72. The locking aperture 72 is sized to selectively and securely receive a corresponding feature of the take-up reel leader 54. The second end 44 of the cartridge tape leader 42 may further define a locating aperture 74 that receives a corresponding component of the cartridge housing 36 (FIG. 3) for maintaining the cartridge tape leader 42 when not in use.

The second end 66 of the take-up reel leader 54 includes a corresponding connection feature 76 as is known in the art. More particularly, the second end 66 forms a neck 78, which terminates in an enlarged tab 80. The enlarged tab 80 is sized in accordance with the locking aperture 72 of the cartridge tape leader 42 so that the enlarged tab 80 may be interposed with the locking aperture 72 to securely and selectively couple the cartridge tape leader 42 to the take-up reel leader 54. The second end 66 of the take-up reel leader 54 may also include a locating aperture 82 to enable the buckling mechanism 58 (FIG. 3) to be inserted and to move the second end 66, so that the enlarged tab 80 interposes the locking aperture 72 to form the buckled connection 84.

Notably, the connection feature 70 of the cartridge tape leader 42 may have a neck and an enlarged tab and the corresponding connection feature 76 may be a locking aperture. Alternatively, other leader connection features known in the art are equally acceptable.

Figure 4B:
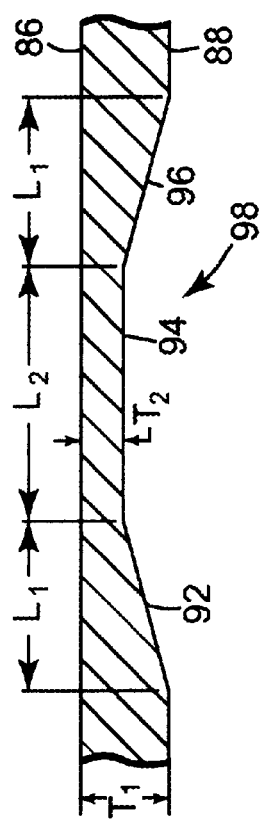
FIG. 4B is a cross-sectional view of the cartridge tape leader tape of FIG. 4A along the line 4B—4B.

With additional reference to the cross-sectional view of FIG. 4B, the elongated section 46 of the cartridge tape leader 42 defines a first face 86 and a second face 88 (it being noted that the first face 86 is visible in FIG. 4A, whereas the second face 88 is hidden). The first face 86 of the cartridge tape leader 42 is substantially flat or continuous throughout the elongated section 46. The second face 88, conversely, forms a cartridge leader smoothing indenture 90 (best shown in FIG. 4B). The cartridge leader smoothing indenture 90 includes a first sidewall 92, a bottom wall 94, and a second sidewall 96. In a preferred embodiment, the cartridge leader smoothing indenture 90 is a cartridge leader smoothing ramp 98, in which each of the walls 92, 94, and 96 extend through an entire width $W_1$ of the cartridge tape leader 42. The first sidewall 92 extends from a first thickness $T_1$, which is equal to a maximum thickness of the cartridge tape leader 42, upward (relative to the orientation of FIG. 4B) to a second thickness $T_2$ over a first length $L_1$. As used throughout the specification, directional terminology, such as "upward," "downward," etc., is used for purposes of illustration only, and is in no way limiting. The second thickness $T_2$ is substantially less than the first thickness $T_1$. Preferably, the second thickness $T_2$ is approximately half of the first thickness $T_1$. The bottom wall 94 extends from the first sidewall over a second length $L_2$, maintaining the second thickness $T_2$ throughout. The bottom wall 94 is connected to the second sidewall 96 opposite the first sidewall 92. The second sidewall 96 extends from the bottom wall 94 over the first length $L_1$ downward to a first thickness $T_1$. The junctions formed by the first sidewall 92, the bottom wall 94, and the second sidewall 96 may form angular or curved corners and remain within the scope of the present invention.

Preferably, the first length $L_1$ is in the range of about 4.57–7.11 mm (0.18–0.28 inch) and the second length $L_2$ is in the range of about 7.36–9.91 mm (0.29–0.39 inch). More preferably, the first length $L_1$ is about 5.84 mm (0.23 inch) and the second length $L_2$ is about 8.64 mm (0.34 inch). However, other lengths and/or thicknesses can also be useful.

Figure 5:
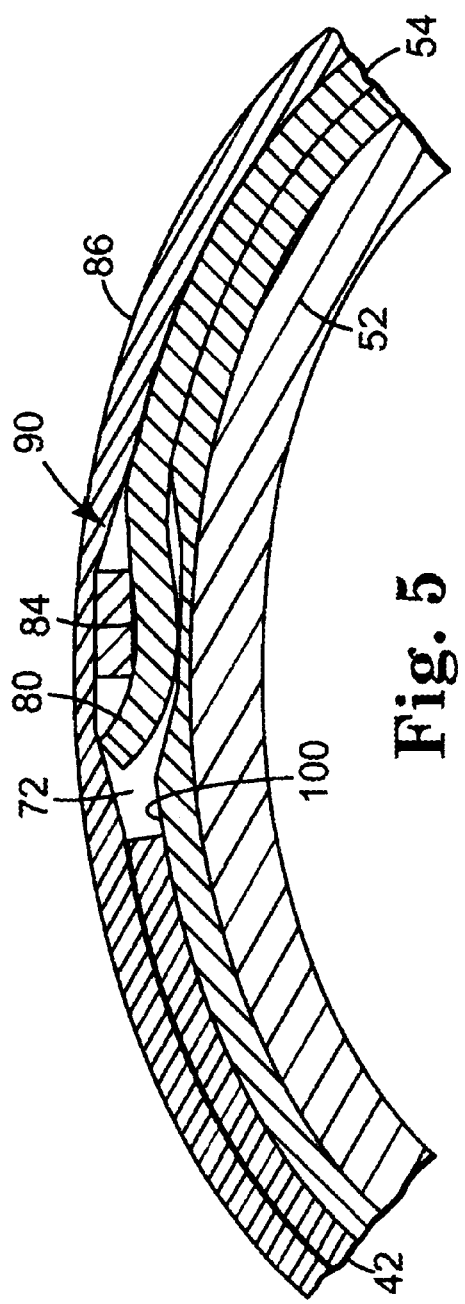
FIG. 5 is a cross-sectional view of the leaders of FIG. 4A wound about the take-up reel of FIG. 3.

A position of the cartridge leader smoothing indenture 90 relative to the locking aperture 72 is a function of the known diameter or circumference of the take-up reel 52 (FIG. 3). More particularly, the cartridge leader smoothing indenture 90 is located approximately one revolution (relative to a diameter of an industry-standard take-up reel 52) from the buckled connection 84, such that upon winding the take-up reel leader 54 and the cartridge tape leader 42 about the take-up reel 52, the cartridge leader smoothing indenture 90 will lie directly above the buckled connection 84 as illustrated in FIG. 5. In this manner, the decreased thickness of the cartridge leader smoothing indenture 90 will partially or completely compensate for the enlarged thickness of the buckled connection 84, so that a bulk of the buckled connection 84 will not create a "bump" on consecutively wound layers of the storage tape 40 (FIG. 3). In this regard, the wound storage tape 40 will lay against the first face 86 of the cartridge tape leader 42. Because the first face 86 is continuous (i.e., characterized by the absence of sharp corners otherwise presented with prior art leaders having an aperture extending through a thickness of the leader), the opportunity for embossment of the storage tape 42 is virtually eliminated. By preferably forming the second thickness $T_2$ to be approximately one-half the first thickness $T_1$, the smoothing indenture 90 is sufficiently sized to accommodate a bulk of the buckled connection 84, yet provides sufficient thickness to prevent the corners formed at the wall 92, 94, 96 intersections from imparting an embossment on subsequently wound layer(s) of the storage tape 40.

Figure 1:
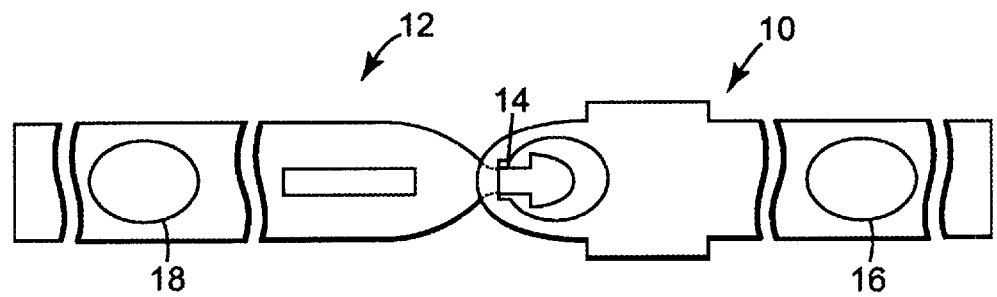
FIG. 1 is a schematic view of a prior art leader configuration.
Figure 2:
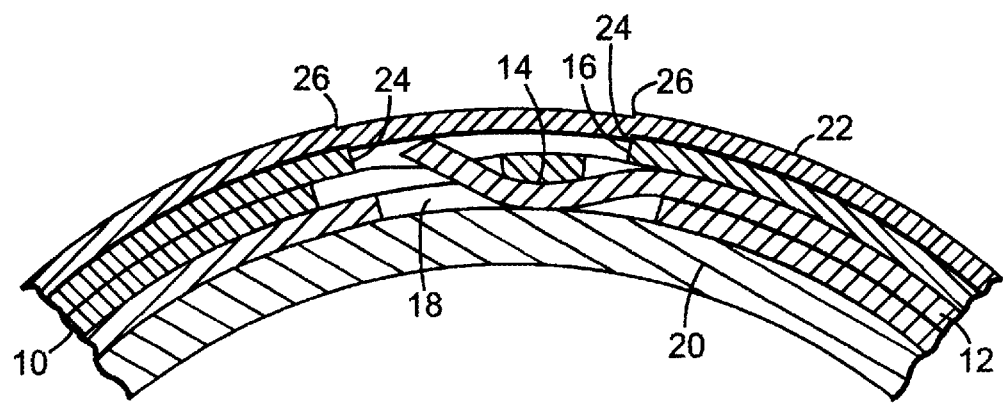
FIG. 2 is a schematic cross-sectional view of a prior art tape winding system including the leader configuration of FIG. 1.

Returning to FIG. 4A, and in one preferred embodiment, the take-up reel leader 54 includes a similar smoothing indenture. More particularly, the take-up reel leader 54 defines a first face 100 and a second face (hidden in the view of FIG. 4A, but analogous to the first face 86 of the cartridge tape leader 42) opposite the first face 100. The second face remains substantially flat throughout the take-up reel leader 54. The first face 100 preferably forms a take-up leader smoothing indenture 102 as a smoothing ramp. The take-up leader smoothing ramp preferably has similar attributes as the cartridge leader ramp 98. The take-up leader smoothing indenture 102 is also located approximately one revolution from the buckled connection 84 (relative to a diameter or circumference of the take-up reel 42 (FIG. 3)), such that the buckled connection 84 will reside within the take-up leader smoothing indenture 102 upon winding as shown in FIG. 5. In this manner, the decreased thickness of the take-up leader smoothing indenture 102 will provide additional compensation for the bulk of the buckled connection 84, thereby preventing layered bumps or embossment of the magnetic storage tape 40. Alternatively, however, the take-up reel leader 54 can include an aperture (such as the aperture 18 of FIG. 1), as with prior art take-up reel leaders.

Figure 6:
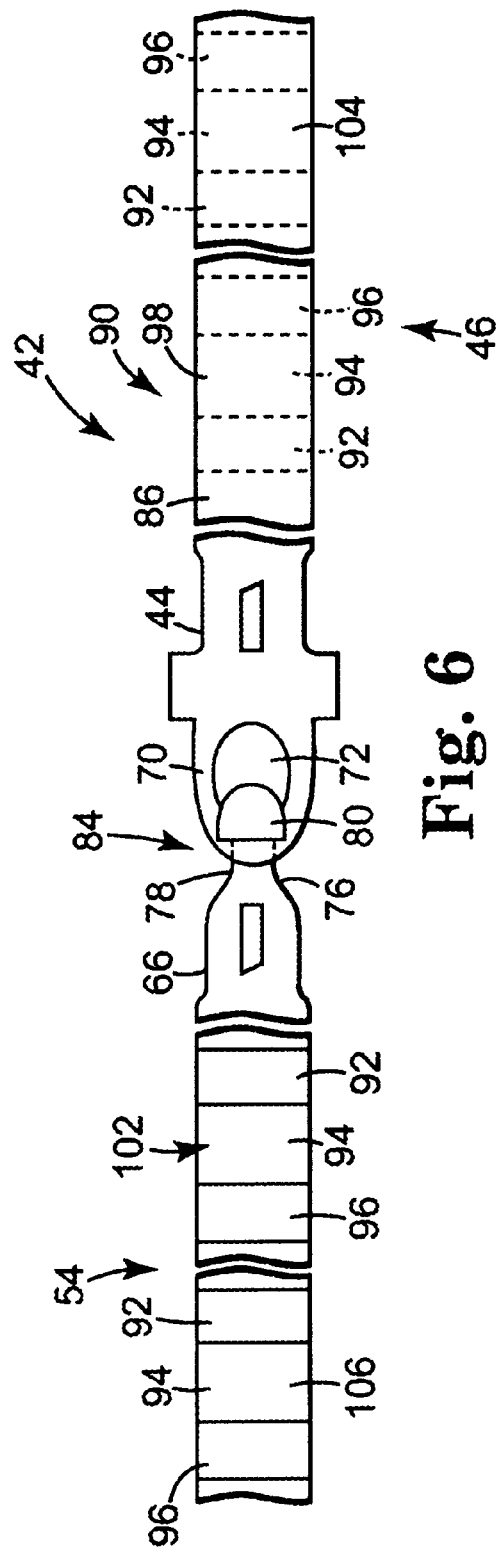
FIG. 6 is a schematic view of a portion of an alternative embodiment cartridge tape leader and take-up reel leader in accordance with the present invention.

In another alternative embodiment illustrated in FIG. 6, the cartridge tape leader 42 further includes a second cartridge leader smoothing indenture 104 located approximately one revolution (relative to a diameter of the take-up reel 52 (FIG. 3)) from the first cartridge leader smoothing indenture 90. The second cartridge leader smoothing indenture 104 has similar attributes as the first cartridge leader indenture 90. Similarly, the take-up reel leader 54 may include a second take-up leader smoothing indenture 106 located one revolution from the first take-up leader smoothing indenture 102. The second take-up leader smoothing indenture 106 has similar attributes as the first take-up leader smoothing indenture 102. The configuration and location of the smoothing indentures 90, 102, 104, and 106, respectively, is such that upon winding the take-up reel leader 54 and cartridge tape leader 42 about the take-up reel 52 (FIG. 5), the second cartridge leader smoothing indenture 104 will lay upon in the first cartridge leader smoothing indenture 90, the first cartridge leader smoothing indenture 90 will lay upon the buckled connection 84, the buckled connection 84 will lay in the first take-up leader smoothing indenture 102 that in turn aligns with the second take-up leader smoothing indenture 106. The generally aligned configuration of the smoothing indentures 90, 102, 104, and 106, relative to the buckled connection 84 during winding provides additional compensation for the added bulk of the buckled connection 84.

Notably, additional smoothing indentures may be located on the cartridge tape leader 42 and/or the take-up reel leader 54. The thicknesses $T_1$, and $T_2$ may vary accordingly, such that the stacked smoothing indentures properly adjust for the bulk of the buckled connection 84 while minimizing embossment of the magnetic storage tape 40 (FIG. 3).

Another alternative embodiment of a cartridge tape leader 142 and a take-up reel leader 154 in accordance with the present invention is shown in FIG. 7A. The cartridge tape leader 142 includes a connection feature 170 and the take-up reel leader 154 includes a corresponding connection feature 176 similar to the connection features 70 and 76 (FIG. 4A) of the previous embodiments. The connection feature 170 is selectively secured to the corresponding connection feature 176 to form a buckled connection 184. An elongated section 146 of the cartridge tape leader 142 defines a first face 186 and an opposing second face 188 (hidden in FIG. 7A, but shown in FIGS. 7B and 7C). The first face 186 remains substantially flat throughout the length of the elongated section 146. The second face 188 defines a cartridge leader smoothing indenture 190 (hidden in the view of FIG. 7A) as a smoothing cavity 198. As best shown in FIGS. 7B and 7C, the smoothing cavity 198 is defined by a first sidewall 192, a bottom wall 194, a second sidewall 196, a third sidewall 208, a fourth sidewall 210, a first support region 212, and a second support region 214.

As illustrated in FIG. 7B, the first sidewall 192 extends from a first thickness $T_1$, which is equal to a maximum thickness of the cartridge tape leader 142, upward to a second thickness $T_2$. The second thickness $T_2$ is preferably substantially less than the first thickness $T_1$. More preferably, the second thickness $T_2$ is about half of the first thickness $T_1$. The first sidewall 192 extends over a first length $L_1$. At the second thickness $T_2$, the bottom wall 194 extends from the first sidewall 192. The bottom wall 194 maintains the second thickness $T_2$ over a second length $L_2$. The second sidewall 196 extends from the bottom wall 194 opposite the first sidewall 192. The second sidewall 196 extends downward from the bottom wall 194 to the first thickness $T_1$, of the cartridge tape leader 142. The second sidewall 196 extends over the first length $L_1$. Preferably, the first length $L_1$ is in the range of about 4.57–7.11 mm (0.18 to 0.28 inch) and the second length $L_2$ is in the range of about 7.36–9.91 mm (0.29–0.39 inch). More preferably, the first length $L_1$ is about 5.84 mm (0.23 inch) and the second length $L_2$ is about 8.64 mm (0.34 inch). However, other lengths based upon the size of the buckled connection 184 are equally acceptable. Notably, the first sidewall 192, the bottom wall 194, and the second sidewall 196 do not extend across an entire width $W_1$ of the cartridge tape leader 142. Rather, the smoothing cavity 198 extends over a second width $W_2$; wherein the second width $W_2$ is less than the first width $W_1$. The second width $W_2$ is preferably centered with respect to the first width $W_1$.

As illustrated in FIG. 7C, the first support region 212 and the second support region 214 are provided at opposing lateral edges of the smoothing cavity 198 to maintain the elongated section 146 at the first width $W_1$. The first support region 212 and the second support region 214 preferably have a thickness corresponding with the first thickness $T_1$. In addition, the third sidewall 208 extends between the first support region 212 and the bottom wall 194 over a third width $W_3$. Similarly, the fourth sidewall 210 extends between the second support region 214 and the bottom wall 194 over the third width $W_3$ thereby forming the smoothing cavity 198. The smoothing cavity 198 is located one revolution from the buckled connection 184 (relative to a known diameter or circumference of the take-up reel 52 (FIG. 5)) such that upon winding about the take-up reel 52, the smoothing cavity 198 lies upon the buckled connection 184.

As with previous embodiments, the smoothing indenture 190 serves to accommodate at least a portion of a bulk of the buckled connection 184, while providing a smooth or continuous surface (i.e., the first face 186) to the storage tape 40 (FIG. 3) subsequently wound around the take-up reel 52 (FIG. 3) and thus the cartridge tape leader 142, thereby minimizing the opportunity for embossment of the storage tape 40. As such, the take-up reel leader 154 can assume a more "standard" form (i.e., incorporating an aperture to receive the buckled connection 184). Alternatively, and with the embodiment of FIG. 7A, the take-up reel leader 154 forms a smoothing indenture similar to the cartridge leader smoothing indenture 190 previously described.

In particular, the take-up reel leader 154 defines a first face 200 and a second face (not shown) opposite the first face 200. The second face remains substantially flat throughout the take-up leader 154. The first face 200 preferably forms a take-up leader smoothing indenture 202 in the form of a smoothing cavity preferably having similar attributes as the cartridge leader smoothing cavity 198 previously described. The take-up leader smoothing indenture 202 is similarly located one revolution from the buckled connection 184 such that upon winding about the take-up reel 52 (FIG. 5), the take-up leader smoothing indenture 202 lies beneath the buckled connection 184. In this manner, the buckled connection 184 is sandwiched between the cartridge leader smoothing indenture 190 and the take-up leader smoothing indenture 202. This sandwiched configuration compensates for the bulk of the buckled connection 184, thereby preventing bumps in the outer windings of the storage tape 40 (FIG. 3).

In yet another embodiment, additional smoothing cavities (not shown) may be positioned along the cartridge tape leader 142 and/or the take-up reel leader 154. Each of the additional smoothing cavities is located a full revolution from either the buckled connection 184 or the preceding smoothing cavity, such that all the smoothing indentures are nested around the buckled connection 184 to prevent bumps and embossment in the storage tape 40.

It should be noted that although both the cartridge tape leaders 42, 142 and the take-up reel leaders 54, 154 of the preferred embodiments include at least one smoothing indenture 90, 190 and 102 and 202, respectively, both of the cartridge tape leaders 42, 142 and take-up reel leaders 54, 154 do not have to define a smoothing indenture to remain within the scope of the present invention. Rather, an embodiment with only one of the two leaders 42, 142 and 54, 154 incorporating a smoothing indenture will also achieve the beneficial results of the present invention. For example, the cartridge tape leader 42 or 142 alone can form a smoothing indenture in accordance with the present invention, with the corresponding take-up reel leader 54 or 154 formed in accordance with a known configuration (i.e., incorporating the aperture 18 of FIG. 1).

The leader of the present invention provides a marked improvement over previous designs. The smoothing indenture limits the creation of bumps in the magnetic storage tape as it is wound about the buckled connection between the cartridge tape leader and the take-up reel leader. Further, by employing a smoothing indenture rather than a smoothing aperture, no unsupported, sharp edges are formed in the leader, and consequently, embossment of the magnetic storage tape is limited.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the art will readily appreciate that the present invention may be implemented in a very wide variety of embodiments. The application is intended to cover any adaptations or variations of the preferred embodiments discussed herein. Therefore, it is manifestly intended that this invention be limited only by the claims and the equivalents thereof.

What is claimed is:

1. A leader for use with a tape reel, the leader comprising:
    a first end;
    a second end spaced from the first end, the second end having a connection feature configured to be selectively coupled to a second leader; and
    an elongated section extending between the first end and the second end, the elongated section defining a first smoothing indenture not otherwise extending through a thickness of the leader, the first smoothing indenture positioned to receive the connection feature as the tape is wound about a tape reel, the first smoothing indenture being configured to limit embossment of an associated storage tape otherwise laying against the leader tape in a wound state.

2. The leader of claim 1, wherein the first smoothing indenture is defined by:
    a first sidewall that slopes from a first leader thickness to a second leader thickness,
    a bottom wall extending from the first sidewall, and
    a second sidewall extending from the bottom wall opposite the first sidewall, the second sidewall being sloped from the second leader thickness to the first leader thickness,
    wherein the second leader thickness is less than the first leader tape thickness.

3. The leader of claim 2, wherein the first sidewall, the bottom wall, and the second sidewall each have a width equal to a width of the leader.

4. The leader of claim 2, wherein the first smoothing indenture has a width less than a width of the leader.

5. The leader of claim 4, wherein the first smoothing indenture is centered with respect to the width of the leader.

6. The leader of claim 4, wherein the elongated section further defines a first support region and a second support region, the first support region positioned opposite the second support region, and further wherein the first smoothing indenture is positioned between the first support region and the second support region.

7. The leader of claim 6, wherein the first smoothing indenture is further defined by a third sidewall and a fourth sidewall, the third sidewall extending between the first support region and the bottom wall, and the fourth sidewall extending between the second support region and the bottom wall, further wherein the third sidewall is opposite the fourth sidewall.

8. The leader of claim 1, wherein the first end is connected to a storage tape, the storage tape being maintained by a cartridge tape reel.

9. The leader of claim 1, wherein the elongated section defines a first face and a second face, the first face remaining substantially flat throughout the elongated section, and the second face defining the first smoothing indenture.

10. The leader of claim 1, wherein the elongated section further defines a second smoothing indenture configured to limit embossment of a storage tape in the wound state.

11. The leader of claim 10, wherein the first smoothing indenture and the second smoothing indenture are positioned such that upon winding the leader about a take-up reel, the first smoothing indenture receives the connection feature and the second smoothing indenture receives the first smoothing indenture.

12. A data storage tape cartridge including:
    a housing;
    a supply reel rotatably disposed within the housing;
    a storage tape having a first end and a second end, the first end maintained by the supply reel; and
    a cartridge tape leader including:
        a first end secured to the second end of the storage tape,
        a second end spaced from the first end, the second end defining a connection feature configured to be selectively coupled with a take-up reel leader, and
        an elongated section extending between the first end and the second end of the cartridge tape leader, the elongated section defining a smoothing indenture not otherwise extending through a thickness of the cartridge tape leader, the smoothing indenture positioned to receive the connection feature as the cartridge tape leader is wound about a take-up reel, the smoothing indenture being configured to limit embossment of the storage tape upon winding about the take-up reel.

13. The data storage tape cartridge of claim 12, wherein the smoothing indenture is defined by:
    a first sidewall that slopes from a first leader thickness to a second leader thickness,
    a bottom wall extending from the first sidewall, and
    a second sidewall extending from the bottom wall opposite the first sidewall, the second sidewall being sloped from the second leader thickness to the first leader thickness,
    wherein the second leader thickness is substantially less than the first leader thickness.

14. The data storage tape cartridge of claim 13, wherein the smoothing indenture has a width less than a width of the cartridge tape leader.

15. The data storage tape cartridge of claim 14, wherein the smoothing indenture is centered with respect to the width of the cartridge tape leader.

16. The data storage tape cartridge of claim 14, wherein the elongated section of the cartridge tape leader further defines a first support region and a second support region, the first support region positioned opposite the second support region, and further wherein the smoothing indenture is positioned between the first support region and the second support region of the cartridge tape leader.

17. The data storage tape cartridge of claim 16, wherein the smoothing indenture includes a third sidewall and a fourth sidewall, the third sidewall extending between the first support edge and the bottom wall, and the fourth sidewall extending between the second support edge and the bottom wall, and further wherein the third sidewall is opposite the fourth sidewall.

18. A tape winding system for winding tape about a reel, the tape winding system comprising:
   a tape drive assembly including:
      a take-up reel;
      a take-up reel leader including:
         a first end secured to the take-up reel,
         a second end spaced from the first end, the second end defining a first connection feature,
         an elongated section extending between the first end and the second end; and
   a data storage tape cartridge including:
      a housing,
      a supply reel rotatably disposed within the housing,
      a storage tape having a first end and a second end, the first end being maintained by the supply reel,
      a cartridge tape leader including:
         a first end secured to the second end of the storage tape,
         a second end spaced from the first end, the second end defining a second connection feature configured to be selectively coupled with the first connection feature, and
         an elongated section extending between the first end and the second end, the elongated section defining a smoothing indenture not otherwise extending through a thickness of the cartridge tape leader, the smoothing indenture being positioned to receive the first connection feature and the second connection feature as the cartridge tape leader is wound about the take-up reel, the smoothing indenture being configured to limit embossment of the storage tape when wound about the take-up reel.

19. The tape winding system of claim 18, wherein the elongated section of the take-up reel leader defines a take-up leader smoothing indenture not otherwise extending through a thickness of the take-up reel leader, the take-up leader smoothing indenture being positioned to receive the first connection feature and the second connection feature as the take-up reel leader and the cartridge tape leader are wound about the take-up reel.

20. The tape winding system of claim 18, wherein the smoothing indenture has a width less than a width of the cartridge tape leader.

* * * * *